Patented Mar. 21, 1939

2,151,661

UNITED STATES PATENT OFFICE 2,151,661

PREGNANOLONES AND A METHOD OF PRODUCING THE SAME

Friedrich Hildebrandt, Hohen Neuendorf, near Berlin, Germany, assignor to Schering Aktiengesellschaft, a corporation of Germany No Drawing. Application August 12, 1936, Serial No. 95,679. In Germany May 29, 1934

11 Claims. (Cl. 260—397)

This invention relates to pregnanolones and a method of producing the same.

The present application is a continuation-in-part of my copending application Serial No. 36,984, filed August 20, 1935.

Pregnanolones have already been produced from pregnandiones by treating pregnandiones with nascent hydrogen or with hydrogen in the presence of catalysts. Thereby, however, it may very readily happen that instead of merely reducing a single keto group both keto groups of the pregnandiones are reduced to secondary alcohol groups, so that on carrying out the reaction pregnandiols are obtained instead of the desired pregnanolones.

In accordance with the present invention it is possible to overcome these disadvantages to a considerable extent and to produce pregnanolones in a simple manner from pregnandiones. The process of the invention consists in treating pregnandiones with such organo-metallic compounds as tend toward the formation of unsaturated hydrocarbons, decomposing the reaction product in a manner known per se, for example, by treating the same with water and dilute acid, and isolating the pregnanolones formed.

As organo-metallic compounds which tend toward the formation of unsaturated hydrocarbons there are suitable for the present purpose compounds like propyl-, isopropyl-, isobutyl-, cyclohexyl- and the like magnesium halogenides and others, as they are mentioned, for example, in Houben-Weyl, Methoden der organischen Chemie, third edition, second volume, page 248 and third volume page 82. The product of the process is intended to serve as intermediate product for the production of therapeutically valuable substances.

The following examples illustrate the invention without, however, limiting the same to them:

Example 1

3.163 grams of pregnandione with a melting point of 116–121° C. are dissolved in 250 ccs. of dry ether and the solution is treated in the course of one hour with an ethereal solution of isopropyl magnesium iodide produced from 0.973 g. of magnesium turnings, 3.992 ccs. of isopropyl iodide in 40 ccs. of dry ether and a trace of iodine. Thereupon the ether is completely evaporated and the residue is heated in an oil bath for 1 hour to 120° C. After cooling, the white preparation is decomposed, that is, hydrolyzed with water and dilute hydrochloric acid, extracted with ether and the ethereal solution is washed consecutively with water, sodium thiosulphate solution and again with water, dried and evaporated. As residue there remains a light yellow very viscous resin.

The reaction product can be freed from any non-alcoholic constituents still present by condensation with m-benzoic acid sulphochloride and precipitation with ether of the pyridonium salt of the ester acid formed thereby. After splitting off the ester salt by heating for 3 hours with 5% aqueous methanolic (1:1) caustic potash lye, there is obtained a viscous slightly coloured resin which boils at about 120–125° C. in a high vacuum under a pressure of about 3–5/1000 mm. As the product still contains a keto group, it can be isolated from accompanying non-ketonic substances with the aid of ketone reagents, that is, substances having a free amino group and capable of condensing with compounds having keto groups. Thus on heating with an excess of semicarbazide acetate in methanolic solution a crude semicarbazone having the formula $C_{22}H_{37}O_2N_3$ is formed that is very difficultly soluble in ether and has a melting point of 143–155° C. (with decomposition).

Example 2

1 gram of pregnandione of M. P. 113–121° C. is dissolved in 50 ccs. of dry ether whereupon the solution is treated with an ethereal solution of isobutyl magnesium iodide produced from 0.308 gram of dry magnesium turnings, 2.329 grams of freshly distilled isobutyl iodide in 40 ccs. of dry ether and a trace of iodine. The reaction liquid is then further heated to boiling for about 1 hour while stirring. After evaporation of the ether the remaining residue is decomposed with ice and dilute hydrochloric acid (1:5), extracted with ether and the ethereal solution washed consecutively with water, sodium thiosulphate solution and again with water, dried and evaporated to dryness. As residue there remains a pure white amorphous mass. By repeated recrystallization of the crude product, for example, from methanol, a well defined crystalline product of M. P. 204–216° C. corresponding to the general formula $C_{21}H_{34}O_2$, can be isolated.

Of course, various other modifications and changes in the reaction conditions and the like may be made by those skilled in the art in accordance with the principles set forth herein and in the claims annexed hereto.

What I claim is:

1. Process for the production of a pregnanolone, comprising treating a pregnandione with an organo-magnesium halide that tends toward the formation of an unsaturated hydrocarbon hydrolyzing the reaction product, and reacting the pregnanolone formed with semicarbazide acetate, separating the semicarbazone, and hydrolyzing the same.

2. Process for the production of a pregnanolone, comprising treating a pregnandione with an organo magnesium halide that tends to toward the formation of an unsaturated hydrocarbon, hydrolyzing the reaction product, and isolating the pregnanolone formed.

3. Process for the production of a prognanolone, comprising treating a pregnandione with isopropyl magnesium iodide, hydrolyzing the reaction product, and isolating the pregnanolone formed.

4. Process for the production of a pregnanolone, comprising treating a pregnandione with isobutyl magnesium iodide, hydrolyzing the reaction product, and isolating the pregnanolone formed.

5. A pregnanolone having a melting point of 204–216° C. and produced from pregnandiones by treating the same with an organo-magnesium halide that tend toward the formation of unsaturated hydrocarbons, hydrolyzing the reaction product, and isolating the pregnanolone formed.

6. A pregnanolone of the general formula $C_{21}H_{34}O_2$, having a melting point of 204–216° C.

7. A pregnanolone semicarbazone of the general formula $C_{22}H_{37}O_2N_3$, having a melting point of 143–155° C.

8. Process for the production of a pregnanolone compound, comprising treating a pregnandione with an organo-magnesium halide that tends toward the formation of an unsaturated hydrocarbon, hydrolyzing the reaction product, and reacting the pregnanolone so formed with a semi-carbazide.

9. A pregnanolone compound of the group consisting of pregnanolone having the general formula $C_{21}H_{34}O_2$ and melting at 204–216° C. and the reaction products thereof with semicarbazides.

10. The method according to claim 2 wherein the isolation of the pregnanolone is effected by treating the reaction mixture with a reagent having a free amino group and capable of forming a condensation product with the carbonyl group of the pregnanolone, separating and hydrolyzing the reaction product so formed and recovering the purified pregnanolone.

11. Process for the production of a pregnanolone, comprising treating a pregnandione with a lower alkyl magnesium iodide, hydrolyzing the reaction product, and isolating the pregnanolone formed.

FRIEDRICH HILDEBRANDT.